United States Patent
Heydt et al.

(10) Patent No.: US 7,062,160 B2
(45) Date of Patent: Jun. 13, 2006

(54) MONITORING CURRENT IN A MOTOR DURING ACCELERATION TO VERIFY MOTOR FREQUENCY LOCK

(75) Inventors: Jeffrey A. Heydt, Oklahoma City, OK (US); David R. Street, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 356 days.

(21) Appl. No.: 10/176,246

(22) Filed: Jun. 20, 2002

(65) Prior Publication Data

US 2003/0175018 A1 Sep. 18, 2003

Related U.S. Application Data

(60) Provisional application No. 60/363,957, filed on Mar. 13, 2002.

(51) Int. Cl.
*H02P 1/46* (2006.01)
*H02P 1/04* (2006.01)

(52) U.S. Cl. .................. 388/847; 388/911; 318/706
(58) Field of Classification Search .............. 388/842, 388/847, 911, 921; 318/434, 430, 778, 560, 318/779
See application file for complete search history.

(56) References Cited

U.S. PATENT DOCUMENTS

| | | | | |
|---|---|---|---|---|
| 4,322,747 A | * | 3/1982 | Dischert et al. .............. 360/71 |
| 4,371,818 A | * | 2/1983 | Lewis ......................... 318/254 |
| 4,539,514 A | * | 9/1985 | Espelage et al. ............ 318/778 |
| 4,547,715 A | * | 10/1985 | Li ............................... 388/822 |
| 4,998,163 A | * | 3/1991 | Salvati ....................... 348/270 |
| 5,093,891 A | * | 3/1992 | Komiyama et al. ......... 388/813 |
| 5,117,165 A | | 5/1992 | Cassat et al. |
| 5,223,772 A | * | 6/1993 | Carobolante ................ 318/254 |
| 5,309,346 A | * | 5/1994 | Gyugyi ........................ 363/54 |
| 5,543,697 A | * | 8/1996 | Carobolante et al. ....... 318/594 |
| 5,629,650 A | * | 5/1997 | Gersbach et al. ............. 331/17 |
| 5,631,999 A | | 5/1997 | Dinsmore |
| 5,701,284 A | * | 12/1997 | Lee .......................... 369/47.44 |
| 5,841,252 A | * | 11/1998 | Dunfield ..................... 318/254 |
| 5,900,706 A | * | 5/1999 | Hisa ........................... 318/437 |
| 5,949,203 A | * | 9/1999 | Buthker ...................... 318/254 |
| 5,982,121 A | * | 11/1999 | Jacobson et al. .......... 318/434 |
| 6,017,590 A | * | 1/2000 | Lindsay et al. ........... 427/430.1 |
| 6,100,656 A | * | 8/2000 | El-Sadi et al. ............. 318/254 |
| 6,118,238 A | * | 9/2000 | Munro et al. ............... 318/141 |
| 6,177,774 B1 | * | 1/2001 | Iwashita et al. ............ 318/434 |
| 6,218,794 B1 | * | 4/2001 | Shimizu et al. ............. 318/254 |

(Continued)

FOREIGN PATENT DOCUMENTS

JP 60141182 A * 7/1985

(Continued)

*Primary Examiner*—David Martin
*Assistant Examiner*—Patrick Miller
(74) *Attorney, Agent, or Firm*—Fellers, Snider, et al.

(57) ABSTRACT

Method and apparatus for accelerating a motor from an intermediate velocity to a final operational velocity. The motor is accelerated from rest to the intermediate velocity through application of fixed duration drive pulses to the spindle motor. Once the motor reaches the intermediate velocity, commutation circuitry and back electromotive force (bemf) detection circuitry use detected bemf from the motor to electronically commutate the motor to accelerate to the final operational speed. A phase lock oscillator (PLO) attempts to acquire frequency lock for the motor. A control circuit measures the current in the motor to evaluate the effectiveness of the phase lock. If the measured current is found to be above a threshold value, the motor is restarted.

17 Claims, 7 Drawing Sheets

U.S. PATENT DOCUMENTS

| | | | |
|---|---|---|---|
| 6,359,410 B1* | 3/2002 | Randolph | 318/599 |
| 6,448,730 B1* | 9/2002 | Lin et al. | 318/434 |
| 6,476,577 B1* | 11/2002 | Gluch | 318/631 |
| 6,771,033 B1* | 8/2004 | Kokami et al. | 318/138 |
| 6,810,339 B1* | 10/2004 | Wills | 702/65 |
| 6,933,699 B1* | 8/2005 | Hsu et al. | 318/635 |
| 2002/0041214 A1* | 4/2002 | Ichimura | 331/14 |
| 2002/0047683 A1* | 4/2002 | Kawashima | 318/721 |
| 2002/0093303 A1* | 7/2002 | Lo | 318/569 |
| 2002/0135333 A1* | 9/2002 | Heydt et al. | 318/560 |
| 2002/0167287 A1* | 11/2002 | Heydt et al. | 318/254 |
| 2002/0171380 A1* | 11/2002 | Heydt et al. | 318/254 |
| 2002/0181137 A1* | 12/2002 | Kimura et al. | 360/73.03 |

FOREIGN PATENT DOCUMENTS

| | | | |
|---|---|---|---|
| JP | 06078580 A | * | 3/1994 |
| JP | 06189572 A | * | 7/1994 |

* cited by examiner

MONITORING CURRENT IN A MOTOR DURING ACCELERATION TO VERIFY MOTOR FREQUENCY LOCK

RELATED APPLICATIONS

This application claims priority to Provisional Application No. 60/363,957 filed Mar. 13, 2002.

FIELD THE INVENTION

The claimed invention relates generally to the field of electro-mechanical systems and more particularly, but not by way of limitation, to a method and apparatus for monitoring the performance of a brushless direct current (dc) spindle motor during acceleration.

BACKGROUND

A disc drive is a data storage device used to store digital data. A typical disc drive includes a number of rotatable magnetic recording discs that are axially aligned and mounted to a spindle motor for rotation at a high constant velocity. A corresponding array of read/write heads access tracks defined on the respective disc surfaces to write data to and read data from the discs.

Disc drive spindle motors are typically provided with a multi-phase, direct current (dc) brushless motor configuration. The phase windings are arranged about a stationary stator on a number of radially distributed poles. A rotatable spindle motor hub is provided with a number of circumferentially extending permanent magnets in close proximity to the poles. Application of current to the windings induces electromagnetic fields that interact with the magnetic fields of the magnets to apply torque to the spindle motor hub and induce rotation of the discs.

Accelerating a spindle motor from rest can be fraught with difficulty and involves a number of important considerations that must be adequately taken into account. First, it is important to accurately determine the rotational state of a disc drive spindle motor prior to application of drive signals to the motor. Application of drive signals to a spindle motor while the motor is in an unknown state could lead to the inadvertent rotation of the motor in the wrong direction. Rotating the spindle motor in the wrong direction, even for a very short time, can lead to premature failure of a disc drive; heads and disc surfaces can be damaged, and lubricating fluid used in hydrodynamic spindle motor bearings can be pumped out of the bearings.

Early disc drive spindle motor designs used Hall effect or similar external sensors to provide an independent indication of motor positional orientation. However, present designs avoid such external sensors and instead use electronic commutation and back electromotive force (bemf) detection circuitry to provide closed-loop spindle motor control, such as discussed in U.S. Pat. No. 5,631,999 issued to Dinsmore. Such approach generally entails applying a predetermined sequence of commutation steps to the phase windings of the spindle motor over each electrical revolution (period) of the motor. A commutation step involves supplying the motor with current to one phase, sinking current from another phase, and holding a third phase at a high impedance in an unenergized state.

Detection circuitry measures the bemf generated on the unenergized phase, compares this voltage to the voltage at a center tap of the windings, and outputs a signal at a zero crossing of the voltages; that is, when the bemf voltage changes polarity with respect to the voltage at the center tap. The point at which the zero crossing occurs is then used as a reference for the timing of the next commutation pulse, as well as a reference to indicate the position and relative speed of the motor. Although a center tapped motor is used for discussion purposes, non-center tapped motors are applicable as well.

Above an intermediate operational speed, the control circuitry will generally be able to reliably detect the bemf from rotation of the spindle motor, and will further be able to use the detected bemf to accelerate the motor to a final operational velocity. Below this intermediate speed, however, closed-loop motor speed control using detected bemf generally cannot be used since the spindle motor will not generate sufficient bemf at such lower speeds.

Thus, a related difficulty encountered in accelerating a disc drive spindle motor from rest is getting the motor to properly and safely rotate up to the intermediate velocity so that the closed-loop motor control circuitry can take over and accelerate the motor up to the operational velocity.

Several approaches have been proposed in the prior art to accelerate a disc drive spindle motor from rest to an intermediate velocity, such as exemplified by U.S. Pat. No. 5,117,165 issued to Cassat et al. This reference generally discloses determining the electrical rotational position of a spindle motor to determine the commutation state of the motor; that is, to determine the appropriate commutation pulses that should be applied to accelerate the motor based on the then-existing motor position. Drive pulses of fixed duration are applied to the motor to induce torque and initiate rotation of the motor, and the electrical rotational position of the motor is measured between application of each successively applied, fixed duration pulse.

Once the motor rotates sufficiently to induce a change in commutation state, the next set of drive pulses are applied, and position measurements are taken between the application of each set of the drive pulses as before. As the motor achieves a higher rotational velocity due to the successive "nudging" provided by the drive pulses, the time between successive commutation states becomes shorter, decreasing the number of drive pulses applied during each commutation state.

The intermediate velocity must be high enough to enable a hand off to the motor control circuitry; that is, the intermediate velocity must be high enough to enable the spindle motor to generate bemf that can be detected and used by the bemf detection circuitry. Sufficient bemf allows frequency lock by the motor control circuitry. This is at least equally important in non-center tapped motors since operation at a lower RPM makes it more difficult to obtain sufficient bemf.

Once the hand off to closed loop control has taken place the control circuitry allows the motor to spin for a short time to allow a phase lock oscillator (PLO) to settle to a frequency. The motor is also accelerated to increase the bemf. This is followed by a coast mode that allows a comparator to determine whether the motor is rotating at a speed corresponding to the PLO frequency. At this point an incorrect rotation speed results in a motor startup retry.

The delays in executing a motor retry after the hand off to closed loop operation can significantly degrade performance and can result in significant damage to the spindle motor. Waiting for the PLO to settle, accelerating the motor to a point of high bemf and comparing the bemf to the PLO frequency can take a significant amount of time. Also, delays in restarting a backward rotating spindle motor can allow this rotation to last more than a harmless period of time and result in damage to the bearings and other internal portions of the disc drive. If the resulting backward rotation causes fluid to leak from the bearings, contamination can result within the sealed environment of the disc drive.

Accordingly, there is a need for improvements in the art whereby a high performance spindle motor can be reliably evaluated during startup for incorrect speed and insufficient frequency lock.

SUMMARY OF THE INVENTION

In accordance with preferred embodiments, a disc drive includes a spindle motor, back electromotive force (bemf) detection circuitry which detects bemf from rotation of the spindle motor above an intermediate velocity, commutation circuitry which electrically commutates the spindle motor in relation to the detected bemf over a range of commutation states, and control circuitry which directs the acceleration of the spindle motor from rest to a final operational velocity.

The spindle motor is initially accelerated from rest to an intermediate velocity by applying drive pulses to the spindle motor. The drive pulses continue until a commutation transition is detected, after which a new set of drive pulses appropriate for the new commutation state (and position measurements) are applied.

Once the intermediate velocity is reached, back bemf can be detected and control circuitry switches from open loop to closed loop control. Thereafter, the spindle motor is accelerated from the intermediate velocity to the final operational velocity using the commutation circuitry and bemf detection circuitry. Zero crossings are detected in relation to bemf from the spindle motor and the zero crossings are used to time the application of subsequent commutation pulses to the motor.

Preferably, operation during closed loop control includes steps of acquiring frequency lock between a phase lock loop (PLL), measuring a current in the spindle motor and determining whether the current exceeds a predetermined threshold. The spindle motor is restarted when the current increases such that the predetermined threshold is exceeded.

When the PLL and the spindle motor are out of phase (i.e., do not achieve phase lock) the PLL does not effectively oppose the applied voltage in the spindle motor. This results in rising current in the spindle motor. Conversely, when phase lock is achieved the PLL opposes the applied voltage and the spindle motor current is contained. The current level therefore provides a valuable tool in identifying the performance of the PLL and the spindle motor. This current is used to determine when to restart the motor based on a motor not achieving phase lock.

The current in the motor is measured at a sense resistor, filtered and averaged prior to being evaluated and compared to the threshold value. When a new startup is necessary, a short delay is implemented in which power is removed from the spindle motor. The delay allows the electrical and mechanical responses of the motor to relax prior to a new acceleration attempt.

Detecting the lack of phase lock in this manner allows the detection of a static or slow moving motor early in the acceleration routine. This method also allows the motor to be shut down before harm can be caused by an incorrectly spinning motor. The method also provides an evaluation method for PLL circuitry and other characteristics that influence hand off speed and motor control.

These and various other features and advantages which characterize preferred embodiments of the present invention will be apparent from a reading of the following detailed description and a review of the associated drawings.

BRIEF DESCRIPTION OF THE DRAWINGS

FIG. 8 is a graphical representation of the current in the motor during the unsuccessful phase lock of FIG. 6.

FIG. 9 is a graphical representation of RPM for a PLL and motor that achieve frequency lock as the motor spins up.

DETAILED DESCRIPTION

Figure 1:
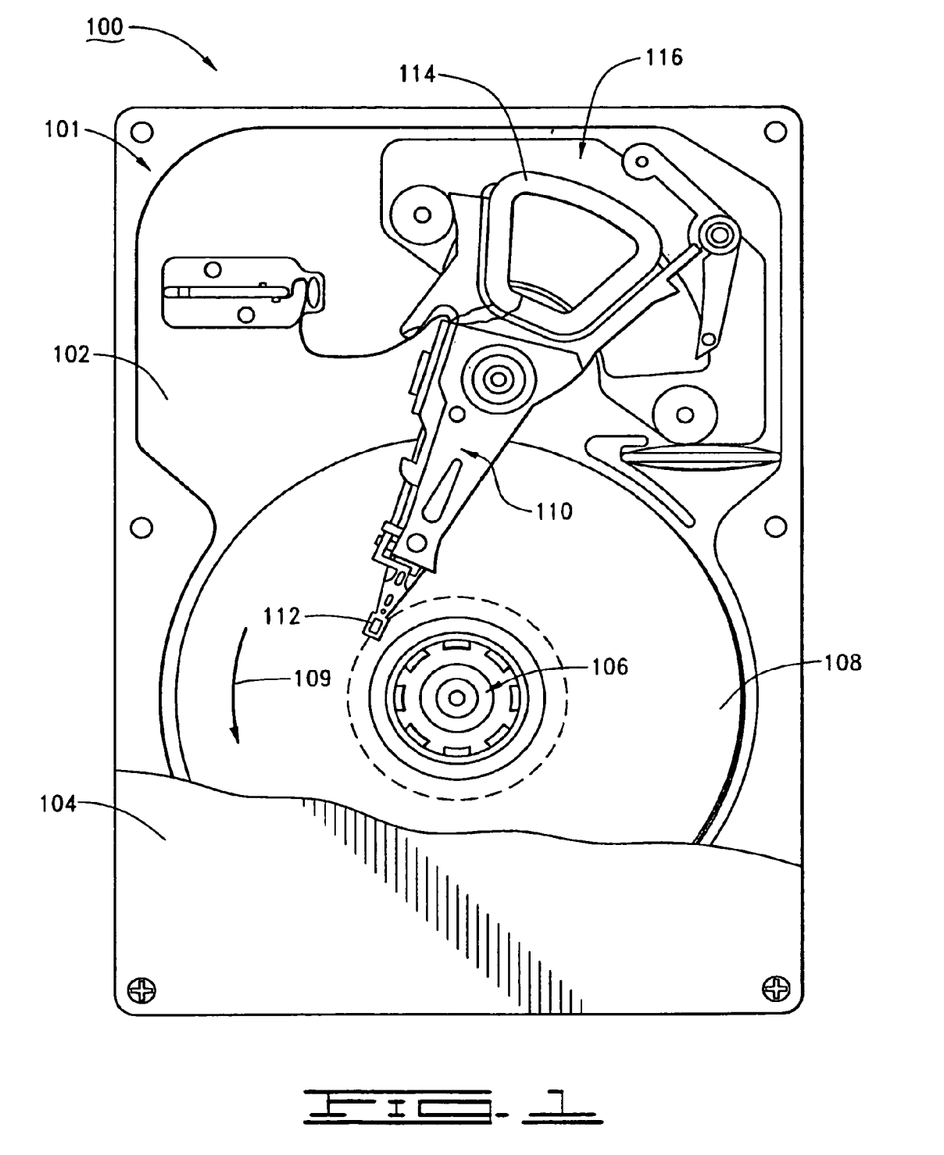
FIG. 1 is a top plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108 in a rotational direction 109. An actuator assembly 110 supports an array of read/write heads 112 adjacent the respective disc surfaces. The actuator assembly 110 is rotated through the application of current to an actuator coil 114 of a voice coil motor (VCM) 116.

Figure 2:
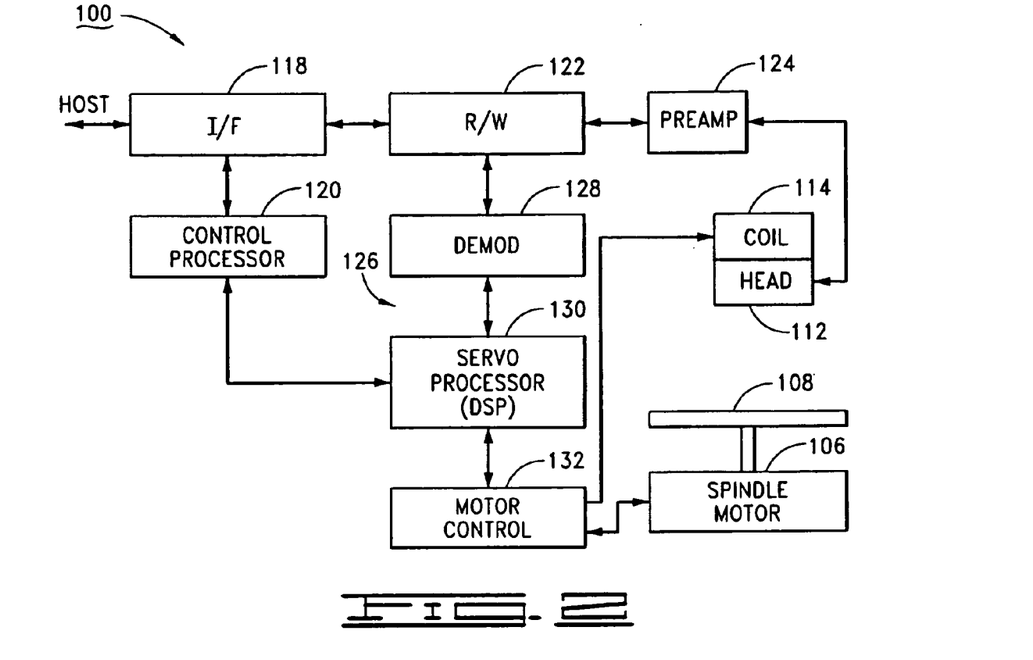
FIG. 2 provides a functional block diagram of the disc drive of FIG. 1.

FIG. 2 provides a functional block diagram of the disc drive 100. FIG. 2 includes control circuitry provided on a disc drive printed circuit board (PCB) affixed to the underside of the disc drive 100, and thus not visible in FIG. 1.

Data and host commands are provided from a host device to the disc drive using interface (I/F) circuitry 118 in conjunction with a top level control processor 120. Data are transferred between the discs 108 and the host device using the I/F circuitry 118, a read/write (R/W) channel 122, and a preamplifier/driver (preamp) circuit 124.

Head positional control is provided by a closed-loop servo circuit 126 comprising demodulation (demod) circuitry 128, a servo processor 130 (preferably comprising a digital signal processor, or DSP) and motor control circuitry 132. The motor control circuitry 132 applies drive currents to the actuator coil 114 to rotate the actuator 110. The motor control circuitry 132 further applies drive signals to the spindle motor 106 to rotate the discs 108.

Figure 3:
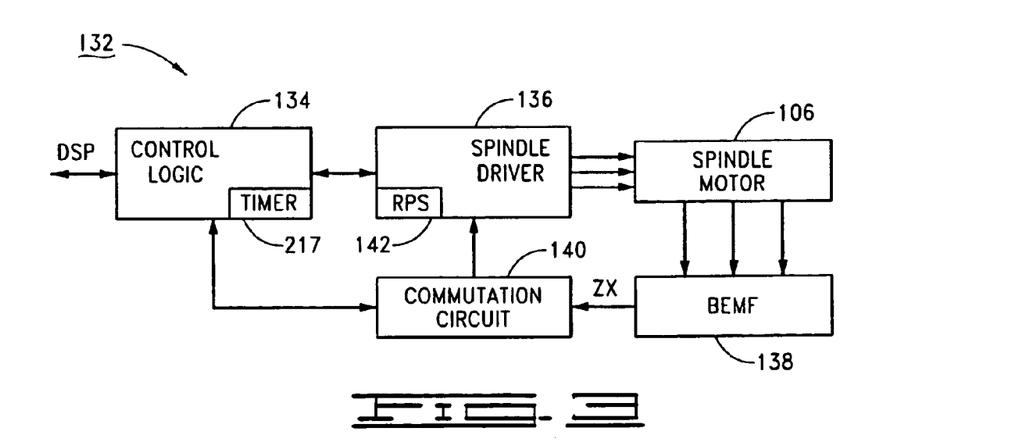
FIG. 3 provides a functional block diagram of relevant portions of the motor control circuitry of FIG. 2.

FIG. 3 provides a functional block diagram of relevant portions of the motor control circuitry 132 of FIG. 2. Control logic 134 receives commands from and outputs state data to the DSP 130. Spindle driver circuitry 136 applies drive currents to the phases of the spindle motor 106 over a number of sequential commutation steps to rotate the motor. During each commutation step, current is applied to one phase, sunk from another phase, and a third phase is held at a high impedance in an unenergized state.

Back electromotive force (bemf) detection circuitry 138 measures the bemf generated on the unenergized phase, compares this voltage to the voltage at a center tap, and outputs a zero crossing (ZX) signal when the bemf voltage changes polarity with respect to the voltage at the center tap. A commutation circuit 140 uses the ZX signals to time the application of the next commutation step.

Figure 4:
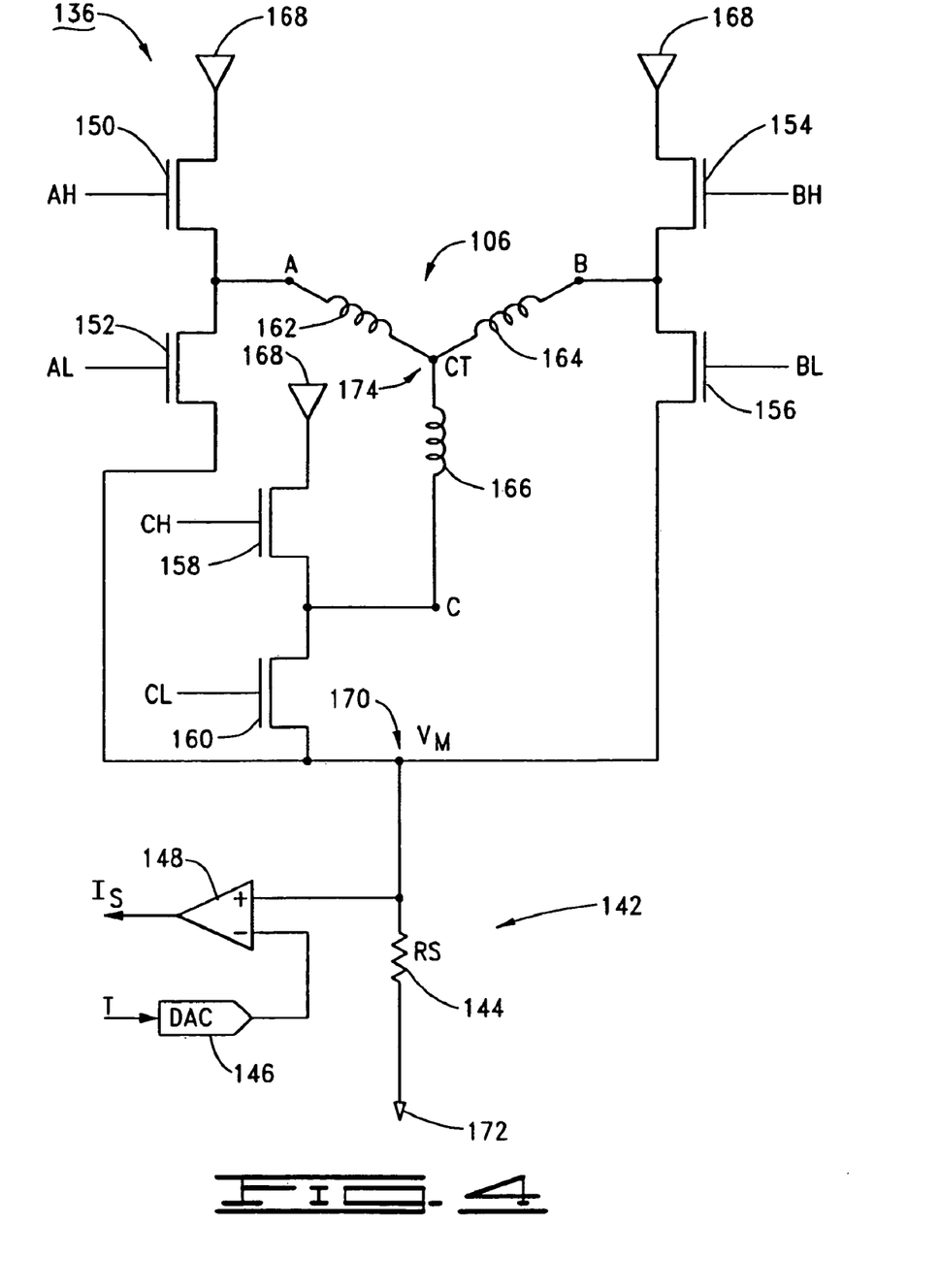
FIG. 4 provides a schematic representation of rotor position sense (RPS) circuitry of the motor control circuitry of FIG. 3.

The spindle driver circuitry 136 includes rotor position sense (RPS) circuitry 142 to detect electrical position of the spindle motor 106 in a manner to be discussed shortly. At this point it will be noted, with reference to FIG. 4, that the RPS circuitry 142 includes a sense resistor RS 144, a digital to analog converter (DAC) 146 and a comparator 148. FIG. 4 also shows the spindle driver circuitry 136 to include six field effect transistors (FETs) 150, 152, 154, 156, 158 and 160, with inputs denoted as AH (A high), AL (A low), BH, BL, CH and CL, respectively. Controlled, timed application of drive currents to the various FETs result in flow of current through A, B and C phase windings 162, 164 and 166 from a voltage source 168 to $V_M$ node 170, through the RS sense resistor 144 to reference node (ground) 172. Spindle motor commutation steps (states) are defined in Table 1:

TABLE 1

| Commutation State | Source Phase | Sink Phase | Phase Held at High Impedance |
|---|---|---|---|
| 1 | A | B | C |
| 2 | A | C | B |
| 3 | B | C | A |
| 4 | B | A | C |
| 5 | C | A | B |
| 6 | C | B | A |

During commutation step 1, phase A (winding 162) is supplied with current, phase B (winding 164) outputs (sinks) current, and phase C (winding 166) is held at high impedance. This is accomplished by selectively turning on AH FET 150 and BL FET 156, and turning off AL FET 152, BH FET 154, CH FET 158 and CL FET 160. In this way, current flows from source 168, through AH FET 150, through A phase winding 162, through the center tap (CT node 174), through B phase winding 164, through BL FET 156 to VM node 170, and through RS sense resistor 144 to ground 172. The resulting current flow through the A and B phase windings 162, 164 induce electromagnetic fields which interact with a corresponding array of permanent magnets (not shown) mounted to the rotor (spindle motor hub), thus inducing a torque upon the spindle motor hub in the desired rotational direction. The appropriate FETs are sequentially selected to achieve the remaining commutation states shown in Table 1.

It will be noted that each cycle through the six commutation states of Table 1 comprises one electrical revolution of the motor. The number of electrical revolutions in a physical, mechanical revolution of the spindle motor is determined by the number of poles. With 3 phases, a 12 pole motor will have four electrical revolutions for each mechanical revolution of the spindle motor.

The frequency at which the spindle motor 106 is commutated, referred to as the commutation frequency FCOM, is determined as follows:

$$FCOM = (phases)(poles)(RPM)/60 \qquad (1)$$

A three-phase, 12 pole spindle motor operated at 15,000 revolutions per minute would produce a commutation frequency of:

$$FCOM = (3)(12)(15,000)/60 = 9,000 \qquad (2)$$

or 9 kHz. The commutation circuit 140 will thus commutate the spindle driver 136 at nominally this frequency to maintain the spindle motor 106 at the desired operational velocity of 15,000 rpm. The foregoing relations can be used to determine the actual motor speed (and therefore speed error) in relation to the frequency at which the zero crossing ZX pulses are provided from the bemf detection circuitry 138.

Figure 5:
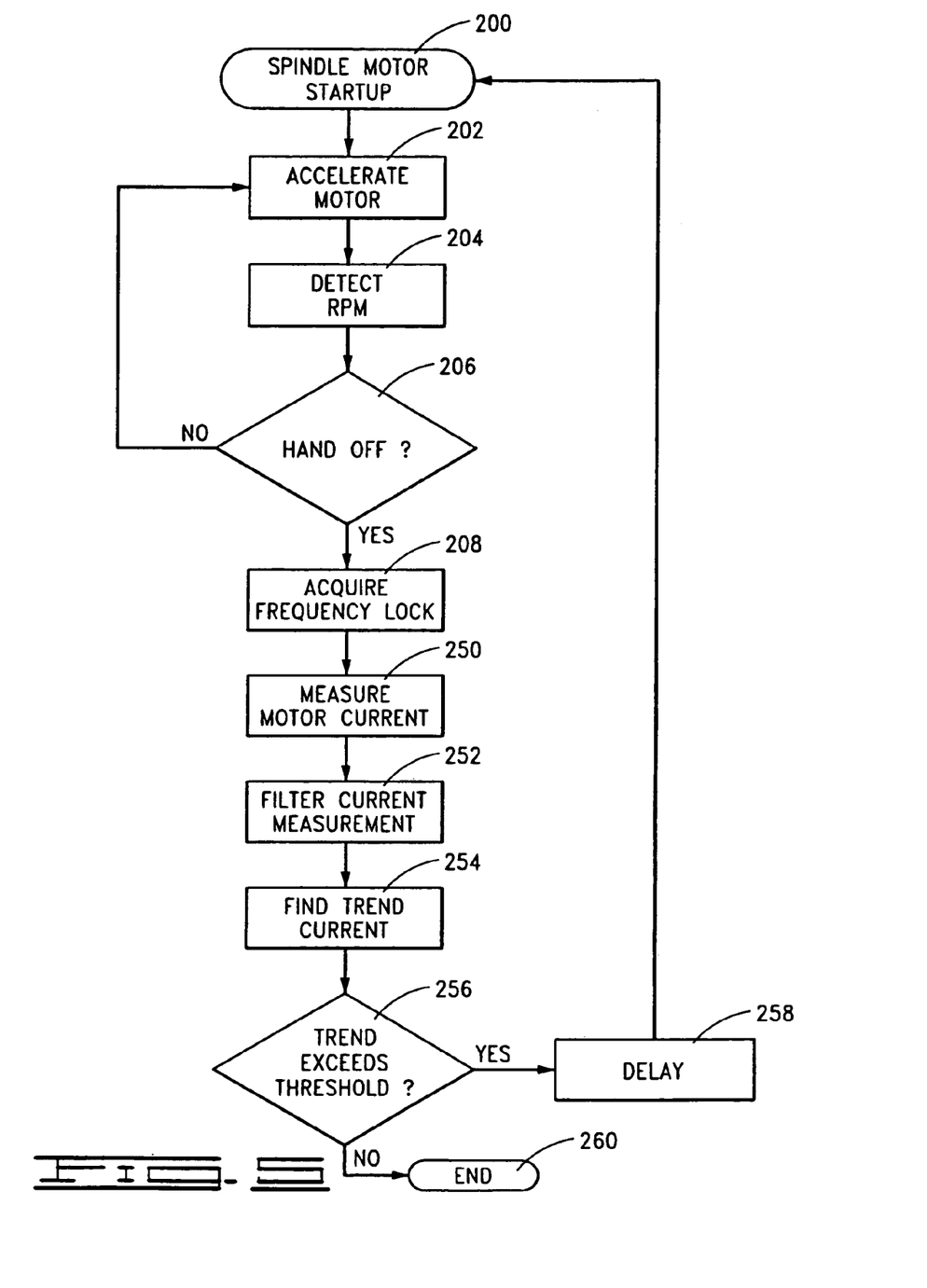
FIG. 5 is a flow chart for a SPINDLE MOTOR START UP routine illustrative of steps carried out in accordance with preferred embodiments of the present invention to accelerate the spindle motor from rest to an intermediate velocity, and then monitor the performance of the spindle motor.

Having concluded a review of relevant circuitry of the disc drive 100, reference is now made to FIG. 5 which provides a flow chart for a SPINDLE MOTOR START UP routine 200 illustrative of steps carried out by the disc drive 100 in accordance with preferred embodiments of the present invention to monitor performance of the spindle motor 106 after hand off to closed loop operation.

More particularly, as explained below the routine accelerates the spindle motor from rest to an intermediate velocity, and then begins to accelerate the motor from the intermediate velocity to the operational velocity using bemf control. For clarity, the intermediate velocity is defined as a medium velocity between the motor at rest and the operational velocity, with the intermediate velocity high enough to enable the spindle motor to generate bemf at a sufficient level for the bemf detection circuitry to reliably detect the bemf and output zero crossing (ZX) signals. The operational velocity is the final velocity at which the spindle motor is normally operated during data transfer operations.

These respective velocities can take any number of relative values depending on the particular application, and are generally related to the specific construction of the spindle motor. For purposes of the present discussion, illustrative values are about 1000 revolutions per minute (rpm) for the intermediate velocity and about 15,000 rpm for the operational velocity. The performance monitoring is preferably utilized just above the intermediate velocity.

The routine initially proceeds to accelerate the spindle motor 106 from rest using open loop control. This may be accomplished in accordance with several methods known in the art. Using one effective method, at step 202 the motor driver circuitry 132 begins the process of accelerating the motor 106 by applying sense pulses to all six commutation states and uses the RPS circuitry 142 to measure the associated rise time of the voltage at $V_M$ node 170. The sense pulses are of small enough amplitude and duration so as to not impart a torque to the spindle motor sufficient to induce movement of the motor, but the pulses are provided with sufficient amplitude and duration to enable detection of the electrical position of the spindle motor 106.

Using the Commutation State 1 discussed above by way of example, a small duration pulse is applied by the controlled activation of AH and BL FETs 150, 156 (FIG. 4). A timer 217 (preferably disposed in the control logic block 134, FIG. 3) is initiated at this time. A suitable digital value for a threshold T is input to the DAC 146 (FIG. 4, also preferably by the control logic 134). The resulting voltage at $V_M$ node 170 will rise in relation to the impedance of the spindle motor 106, and the impedance of the spindle motor 106 will vary depending upon the electrical position of the motor.

The comparator 148 is configured to receive the $V_M$ voltage at its + input and the (analog equivalent) threshold voltage T at its − input. When the $V_M$ voltage eventually reaches the threshold level T, the comparator will output an $I_S$ pulse. The receipt of the $I_S$ pulse will cause the control logic 134 to stop the timer, report the elapsed time between, and instruct the spindle driver circuitry 136 to cease further application of the drive pulse (i.e., AH and BL FETs 150, 156 are turned off).

The foregoing operation is thus performed during step 202 for each of the six commutation states in turn, and an elapsed time is obtained for each of the six commutation states. The elapsed times are used to detect the electrical position of the spindle motor 106.

The routine then proceeds to step 204 to determine the motor velocity. Since the motor is still under open loop control, velocity estimates are used to determine the velocity. The velocity must be high enough for the circuitry 138 to detect sufficient bemf such that hand off to closed loop control can be made. The velocity required to detect sufficient bemf varies with different motor configurations and is determined in conjunction with the corresponding bemf and motor configuration.

At decision step 206 the routine determines whether the hand off can be made. If not, the routine returns to step 202 to continue acceleration of the motor until the spindle motor 106 reaches the intermediate velocity and the detected bemf can allow the hand off to closed loop control.

Once the spindle motor 106 reaches the intermediate velocity, the motor control circuitry 132 passes to steady-state (normal) closed-loop control mode. The resulting hand off in control is shown by passage of the routine from decision step 206 to step 208, wherein the motor velocity is high enough to generate bemf that can be detected and used by the bemf detection circuitry 138 to attempt to acquire frequency lock. The motor control frequency proceeds to accelerate the motor to the operational velocity (such as about 15,000 rpm).

Figure 6:
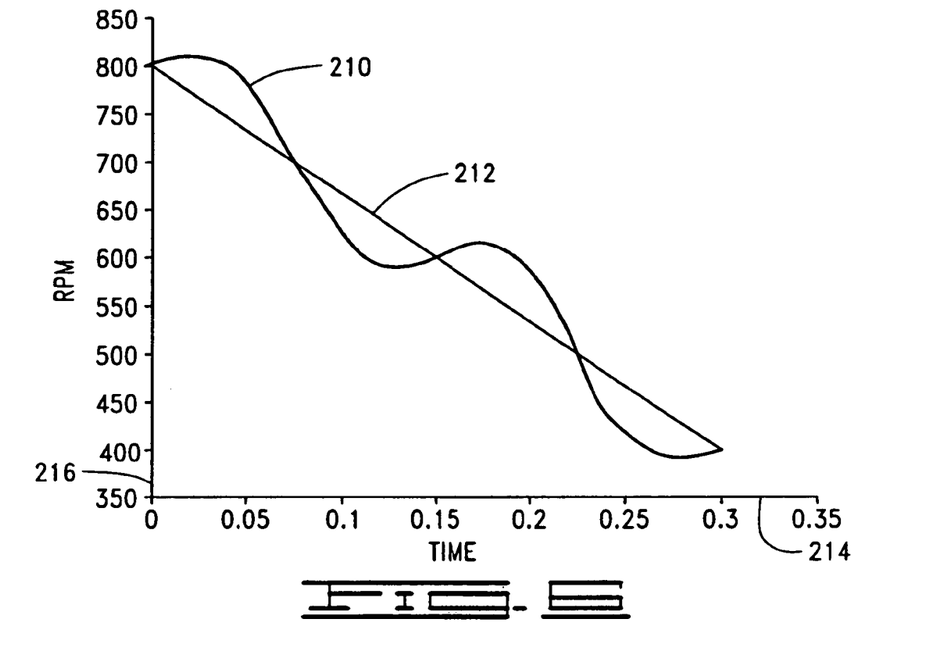
FIG. 6 is a graphical representation of RPM for a phase lock loop (PLL) and motor that do not achieve frequency lock as the motor spins down.
Figure 7:
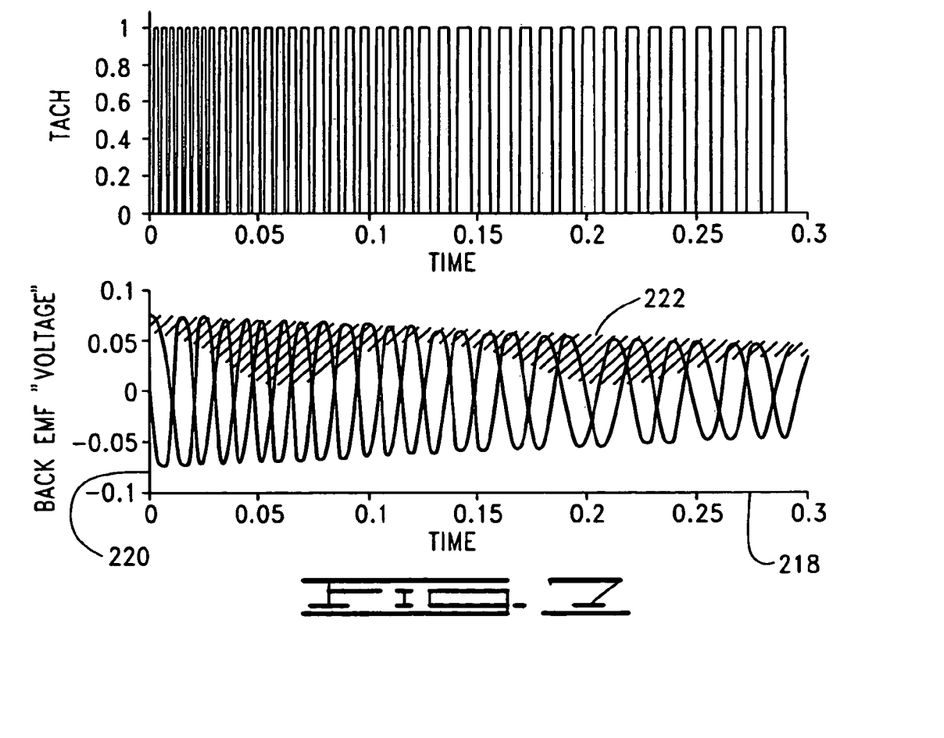
FIG. 7 is a graphical representation of the bemf in the motor during the unsuccessful phase lock of FIG. 6.

It is now helpful to refer to FIGS. 6, 7 to observe the relationship between the motor control frequency, motor bemf and motor speed. FIG. 6 shows two rpm curves 210, 212 for a phase lock loop (PLL) and a spindle motor 106.

The PLL is indicative of programming and circuitry in the motor control 132. The PLL attempts to lock the frequency of a phase lock oscillator (PLO) to that of the spindle motor 106. The curves 210, 212 are plotted against an elapsed time x-axis 214 and an rpm y-axis 216. The curves 210, 212 demonstrate the case where the PLL and spindle motor 106 do not lock and the motor 106 spins down. The PLL frequency 210 is oscillating around the motor frequency 212 and does not achieve frequency lock.

FIG. 7 shows the corresponding bemf for the motor depicted in FIG. 6. The bemf for each of the motor phases is plotted as the motor velocity decreases against an elapsed time x-axis 218 and a bemf y-axis 220. The dark trace area 222 represents the bemf as seen by the motor control circuitry 132 due to an incorrect phase chosen by the PLL and resulting in an unsuccessful frequency lock.

Referring now to FIG. 8, the curve 224 is plotted against an elapsed time x-axis 226 and motor current on the y-axis 228. The curve 224 represents the current in the motor 106 corresponding to the motor depicted in FIGS. 6, 7. The increasing current in the motor 106 is indicative of a motor bemf that is out of phase with the PLL. A bemf that is out of phase does not effectively oppose the applied voltage and therefore does not limit the motor current, resulting in a higher motor current.

Figure 10:
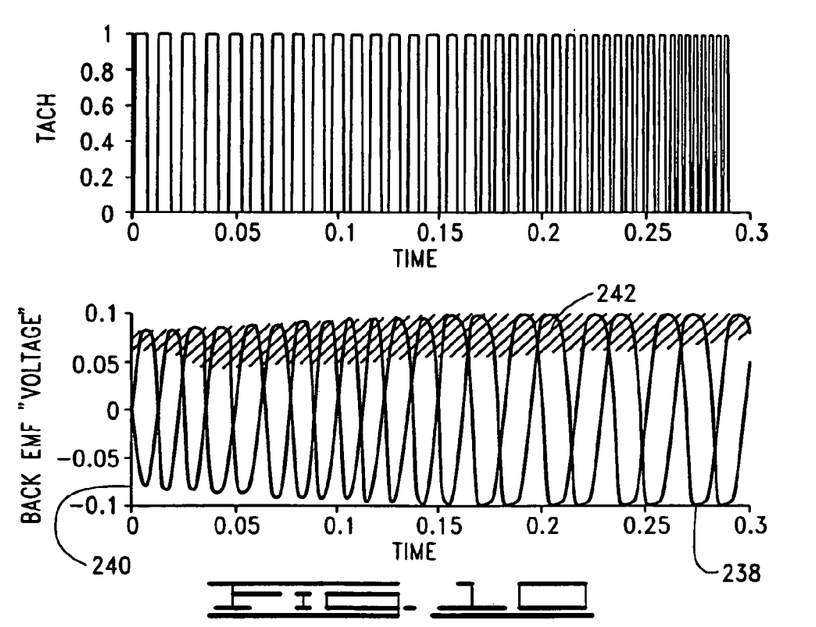
FIG. 10 is a graphical representation of the bemf in the motor during the successful phase lock of FIG. 9.
Figure 11:
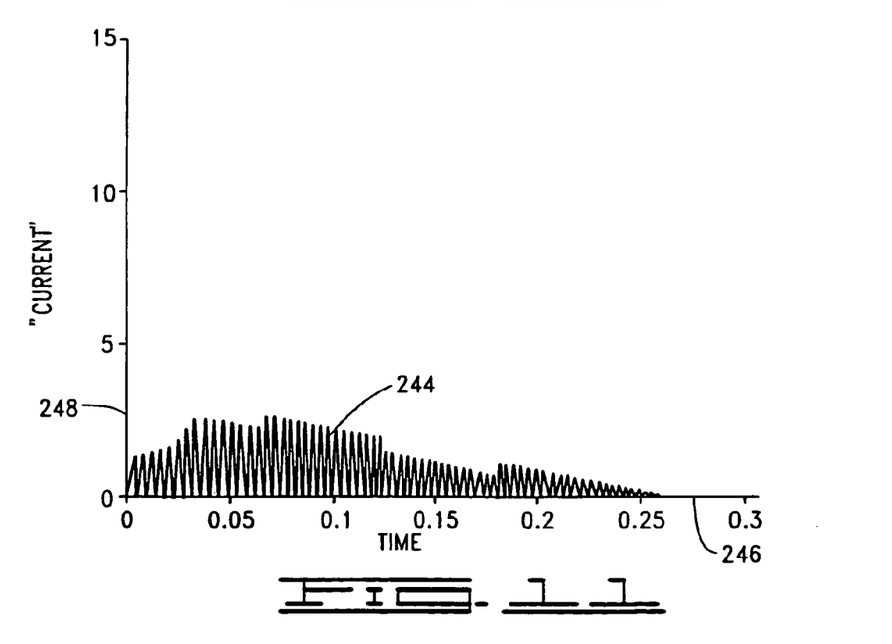
FIG. 11 is a graphical representation of the current in the motor during the successful phase lock of FIG. 9.

FIGS. 9–11 demonstrate characteristics of a motor that does achieve lock with the PLL, and therefor spins up to a higher rpm. FIG. 9 shows two rpm curves 230, 232 for a PLL and spindle motor 106 plotted against an elapsed time x-axis 234 and an rpm y-axis 236. The curves 230, 232 demonstrate a case where the PLL and the motor achieve lock early and stay in phase, unlike the corresponding signals from FIG. 6 where the PLL frequency oscillates around that of the motor.

FIG. 10 demonstrates the corresponding bemf for a motor 106 that has achieved frequency lock. The bemf for each of the motor phases is plotted as the motor velocity increases against an elapsed time x-axis 238 and a bemf y-axis 240. The dark trace area 242 represents the bemf as seen by the motor control circuitry 132 due to a correct phase chosen by the PLL and resulting in a successful frequency lock.

Referring now to FIG. 1, the curve 244 is plotted against an elapsed time x-axis 246 and y-axis 248 for motor current. The motor current 244 indicates a bemf that is in phase with the PLL. As is illustrated, a PLL in phase with the motor results in a bemf that opposes the applied voltage and thereby limits the motor current. The current in the motor 106 is therefore useful in indicating whether phase lock has occurred.

Returning now to FIG. 5, once the start up routine 200 has switched to closed loop control and attempted to acquire frequency lock at step 208, the routine proceeds to step 250. At step 250 the current in the motor 106 is measured, preferably at the sense resister 144 in the RPS circuitry 142 (FIG. 4). Due to noise present at the sense resister 144 the current measurement typically should be filtered. The filtering of the current measurement occurs at step 252 to reduce the noise in the current signal.

Steps 250, 252 preferably take place over several revolutions of the motor until sufficient samples of the current are obtained, so that an accurate evaluation of the current can be determined.

At step 254 the trend of the current is determined by the motor control circuitry 132 and compared with a predetermined threshold level of current. The trend can be determined in many ways such as statistical evaluation based on average, standard deviation, mean or any other method that evaluates the rising or falling nature of the current. As discussed above, a rising level of current in the motor 106 indicates a failure to achieve frequency lock. An illustrative level of the current threshold is up to 3 amps, but can change for various motor configurations. At decision step 256 the motor control circuitry 132 determines whether the motor current has exceeded the threshold, and ultimately whether a motor restart is needed.

If the current threshold is exceeded the routine proceeds to step 258 to shut down acceleration of motor 106 and delay operation until it is safe to again accelerate the motor 106, or until the motor stops spinning. Failure to delay can continue in the operation of an incorrectly spinning motor and also can result in damage to the disc drive. After the motor 106 has been allowed to safely power down the routine returns to step 200 to again begin the motor start up routine. If the current threshold is not exceeded at decision step 256, which indicates a properly locked motor, the start up routine ends at step 260 so that the motor 106 can be accelerated in accordance with normal acceleration methods up to the operating velocity.

It will now be appreciated that the routine of FIG. 5 provides several advantages over the prior art. One advantage is that incorrect operation of the motor can be quickly and readily detected. This allows a start up retry to be performed earlier and therefore save valuable operating time. Another advantage is that the detection of an improper PLO lock can be detected well before the motor is allowed to rotate in the incorrect direction. This avoids damage to the motor and disc drive due to negative torque, damage in which fluid bearing motors are especially susceptible.

Still another advantage provides a measurement tool for use in drive development. Determination of how well a PLO is locking to the motor provides information to help evaluate and optimize the hand off velocity and external components that influence the locking ability of a PLO to a motor.

Accordingly, it will now be understood that the present invention, as embodied herein and as claimed below, is directed to a method and apparatus for monitoring a disc drive spindle motor during motor start up. In accordance with preferred embodiments, a disc drive (such as 100) includes a spindle motor (such as 106), back electromotive force (bemf) detection circuitry (such as 138) which detects bemf from rotation of the spindle motor above a nominal rotational velocity, commutation circuitry (such as 140) that electrically commutates the spindle motor in relation to the detected bemf over a range of electrical rotational positions, and control circuitry (such as 120, 132) which controls the acceleration of the spindle motor.

During a start up, the spindle motor is initially accelerated from rest to an intermediate velocity by applying fixed duration drive pulses to the spindle motor and detecting successive spindle motor commutation state transitions as the spindle motor rotates through a range of commutation states.

Once the intermediate velocity is reached and a hand off to closed loop operation has begun, the spindle motor is evaluated for proper operation by monitoring the motor current. The motor current is measured, filtered and averaged, prior to comparison to a predetermined threshold indicative of an incorrectly operating motor. Thereafter, the spindle motor is either restarted or accelerated to the operational velocity depending on the current level present in the motor.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for the motor start routine while maintaining the same functionality without departing from the spirit and scope of the invention.

In addition, although the embodiments described herein are generally directed to a motor start routine for a disc drive, it will be appreciated by those skilled in the art that the routine can be used for other devices to accelerate a rotatable member from rest without departing from the spirit and scope of the claimed invention.

What is claimed is:

1. A method comprising comparing a direct current (dc) motor current to a predetermined threshold in determining that frequency lock is acquired with a phase locked oscillator (PLO) circuit when the current does not exceed the threshold, powering down and subsequently restarting the motor when the current exceeds the threshold, and else accelerating the motor to a final operational velocity.

2. The method of claim 1, wherein the powering, down and subsequently restarting step comprises allowing the motor to come to rest and reinitiating open loop acceleration control, and wherein the method further comprises repeating the comparing step after the powering down and subsequently restarting step.

3. The method of claim 1, wherein the comparing step further comprises filtering the current to provide a filtered current and comparing the filtered current to the predetermined current threshold.

4. The method of claim 1, wherein the powering down and subsequently restarting step further comprises delaying the restart until the motor has stopped rotating.

5. The method of claim 1, wherein the predetermined current threshold is adjusted for various motor configurations.

6. The method of claim 1, wherein the motor is accelerated to the final operational velocity when the current stays below the predetermined threshold indicative that the motor speed remains frequency locked with the PLO circuit.

7. The method of claim 1, wherein the motor comprises a direct current (dc) multiphase brushless spindle motor.

8. An apparatus, comprising:
a direct current (dc) motor configured to rotate at least one storage medium;
a phase locked oscillator (PLO) circuit; and
a control circuit configured to accelerate the motor from rest to an intermediate velocity, attempt to acquire frequency lock between a speed of the motor and the PLO circuit, and abort further acceleration of the motor when a magnitude of current in the motor indicates that said frequency lock was not successfully acquired.

9. The apparatus of claim 8, wherein the motor comprises a direct current (dc) multiphase brushless spindle motor.

10. The apparatus of claim 8, wherein the control circuit accelerates the motor from the intermediate velocity to a final operational velocity when the magnitude of current indicates that said frequency lock has been acquired.

11. The apparatus of claim 8, wherein the control circuit filters and averages said magnitude of current and compares said filtered and averaged current to a predetermined threshold.

12. The apparatus of claim 8, wherein the control circuit subsequently restarts the motor when frequency lock has not been acquired.

13. The apparatus of claim 8 comprising a sense circuit, wherein the sense circuit comprises:
a sense resistor connected in series between windings of the motor and ground.

14. An apparatus, comprising:
a motor configured to rotate at least one storage medium;
a phase locked oscillator (PLO) circuit; and
means for determining whether frequency lock has been acquired between the motor and the PLO circuit and for accelerating the motor from an intermediate velocity to a final operational velocity when said frequency lock has been determined as being acquired.

15. A method comprising:
accelerating a motor using open loop acceleration control and transitioning to closed loop acceleration control, said closed loop acceleration control provided in relation to back electromotive force (bemf) generated by the motor; and
determining whether frequency lock has been acquired between a phase lock oscillator (PLO) circuit and the motor during the closed loop acceleration control of said motor by comparing a magnitude of a measured current flowing through the motor to a threshold value.

16. The method of claim 15, further comprising a step of aborting further acceleration of the motor when the determining step determines that frequency lock has not been acquired.

17. The method of claim 16, wherein the aborting step further comprises allowing the motor to come to rest when the determining step determines that frequency lock has not been acquired.

* * * * *